US011724817B2

(12) United States Patent
Calderon Gomez et al.

(10) Patent No.: US 11,724,817 B2
(45) Date of Patent: Aug. 15, 2023

(54) AIRCRAFT AND METHOD OF OPERATING AN AIRCRAFT COMPRISING AN AIR SEPARATION DEVICE

(71) Applicant: AIRBUS OPERATIONS SL, Madrid (ES)

(72) Inventors: Pablo Manuel Calderon Gomez, Madrid (ES); Carlos Casado-Montero, Madrid (ES)

(73) Assignee: AIRBUS OPERATIONS SL, Madrid (ES)

( * ) Notice: Subject to any disclaimer, the term of this patent is extended or adjusted under 35 U.S.C. 154(b) by 0 days.

(21) Appl. No.: 17/550,268

(22) Filed: Dec. 14, 2021

(65) Prior Publication Data

US 2022/0185495 A1 Jun. 16, 2022

(30) Foreign Application Priority Data

Dec. 16, 2020 (EP) .................................... 20383098

(51) Int. Cl.
| | |
|---|---|
| *B64D 37/32* | (2006.01) |
| *B64D 37/30* | (2006.01) |
| *F02C 3/00* | (2006.01) |
| *F02M 67/06* | (2006.01) |
| *F02C 7/22* | (2006.01) |

(Continued)

(52) U.S. Cl.
CPC ........... *B64D 37/32* (2013.01); *B01D 53/229* (2013.01); *B64D 31/00* (2013.01); *B64D 33/02* (2013.01); *B64D 37/30* (2013.01); *B64D 37/34* (2013.01); *B64D 41/00* (2013.01); *F02C 3/00* (2013.01); *F02C 7/22* (2013.01); *F02M 67/06* (2013.01); *B64D 2013/0677* (2013.01); *B64D 2033/0213* (2013.01); *F05D 2220/323* (2013.01); *F23K 2900/05082* (2013.01)

(58) Field of Classification Search
CPC ..................... B64D 37/32; B64D 37/34; B64D 2013/0677; F02C 3/20; F02C 3/30; F23L 2900/07002; F23L 2900/07003; F23K 2900/05082; F02M 67/06
See application file for complete search history.

(56) References Cited

U.S. PATENT DOCUMENTS

| | | | |
|---|---|---|---|
| 5,131,225 A | | 7/1992 | Roettger |
| 6,256,975 B1 | * | 7/2001 | Dobbeling ............. B64D 37/32 |
| | | | 60/776 |

(Continued)

FOREIGN PATENT DOCUMENTS

| | | |
|---|---|---|
| FR | 3011484 | 4/2015 |
| WO | 2015/050601 | 4/2015 |

OTHER PUBLICATIONS

Extended Search Report for EP20383098, dated Jun. 9, 2021, 14 pages.

*Primary Examiner* — Alain Chau
(74) *Attorney, Agent, or Firm* — Nixon & Vanderhye P.C.

(57) ABSTRACT

An aircraft including a combustion engine with a combustion chamber an injection device for injecting fuel in the combustion chamber and an air separation device adapted to separate air into an oxygen-enriched gas mix and a nitrogen-enriched gas mix, wherein the oxygen-enriched gas mix is injected into the combustion chamber with the fuel while the nitrogen-enriched gas mix is used to inert at least some portions of the aircraft in the environment of said combustion engine.

17 Claims, 2 Drawing Sheets

(51) Int. Cl.
  *B01D 53/22*  (2006.01)
  *B64D 31/00*  (2006.01)
  *B64D 33/02*  (2006.01)
  *B64D 41/00*  (2006.01)
  *B64D 37/34*  (2006.01)
  *B64D 13/06*  (2006.01)

(56) References Cited

U.S. PATENT DOCUMENTS

| | | | | |
|---|---|---|---|---|
| 7,153,343 | B2* | 12/2006 | Burlatsky | B01D 61/00 96/6 |
| 7,465,335 | B2* | 12/2008 | Schmidt | B01D 69/00 96/6 |
| 7,632,338 | B2* | 12/2009 | Cipollini | B01D 19/0084 204/266 |
| 8,177,884 | B2* | 5/2012 | Schmidt | B01D 19/0031 96/6 |
| 8,801,831 | B1* | 8/2014 | Snow, Jr. | A62C 99/0018 244/135 R |
| 9,272,790 | B2 | 3/2016 | Fukuda | |
| 9,901,867 | B2 | 2/2018 | Roussin-Bouchard et al. | |
| 10,400,676 | B2* | 9/2019 | Ribarov | B64D 41/00 |
| 10,576,397 | B2* | 3/2020 | Cordatos | B01D 19/0036 |
| 10,633,110 | B2* | 4/2020 | Sarkar | B64D 37/32 |
| 2005/0211096 | A1* | 9/2005 | Burlatsky | F02C 7/224 96/6 |
| 2006/0169138 | A1* | 8/2006 | Schmidt | B01D 67/0009 95/54 |
| 2006/0278073 | A1* | 12/2006 | McHugh | B01D 19/0031 96/6 |
| 2007/0006591 | A1* | 1/2007 | Spadaccini | F23K 5/20 60/734 |
| 2007/0130956 | A1* | 6/2007 | Chen | C10G 31/11 60/723 |
| 2008/0083608 | A1* | 4/2008 | Cipollini | B01D 19/0084 204/157.5 |
| 2008/0223988 | A1 | 9/2008 | Lessi et al. | |
| 2012/0137879 | A1* | 6/2012 | Taylor | B01D 19/0031 96/6 |
| 2016/0369700 | A1* | 12/2016 | Ribarov | B64D 37/34 |
| 2018/0229853 | A1* | 8/2018 | Sarkar | B64D 37/32 |
| 2019/0054423 | A1* | 2/2019 | Cordatos | B01D 71/36 |
| 2019/0060787 | A1* | 2/2019 | Cordatos | B01D 19/0036 |
| 2019/0137104 | A1* | 5/2019 | Jain | F02C 7/222 |
| 2019/0282951 | A1* | 9/2019 | Rheaume | C01B 21/0438 |
| 2019/0293346 | A1 | 9/2019 | Schwarz et al. | |
| 2020/0140111 | A1* | 5/2020 | O'Connor | F02C 7/222 |
| 2020/0189761 | A1* | 6/2020 | Emerson | B64D 37/32 |
| 2021/0380269 | A1* | 12/2021 | Sipprell | B64D 37/32 |

* cited by examiner

AIRCRAFT AND METHOD OF OPERATING AN AIRCRAFT COMPRISING AN AIR SEPARATION DEVICE

RELATED APPLICATION

This application claims priority to and incorporates by reference European Patent Application 20383098-9, filed Dec. 16, 2020.

TECHNICAL FIELD

The invention relates to aircraft inerting systems that prevents unwanted combustion in the aircraft. In particular, the invention relates to an air separation device adapted to provide a nitrogen-enriched air to inert some areas of the aircraft, such as an auxiliary power unit (APU).

BACKGROUND

Inerting hazardous areas of an aircraft is an important aspect of aircraft safety. For example, inerting systems are used for fuel systems and fuel tanks for the combustion engines, e.g., gas turbines, in an aircraft. The inerting systems ensure a low level of oxygen in the fuel systems and fuel tanks to prevent fires and explosions.

U.S. Pat. No. 9,272,790 (790 Patent) describes an aircraft with an air separation module for producing a nitrogen enriched gas supply to a fuel tank. The air separation module inerts a fuel tank by drastically reducing the oxygen content of the gas mixture surrounding fuel in the fuel tank. The 790 Patent provides insight on the temperature control of air supplied to the air separation module to increase its operating life. The 790 Patent does not describe optimizing the use and weight of the inerting system on-board the aircraft. Moreover, some areas of the aircraft may not be inerted with the system described in the 790 Patent.

Moreover, the fuel efficiency of an aircraft is an important criteria in an aircraft design, because an aircraft with a low fuel consumption has a low environmental impact and low operating costs.

U.S. Pat. No. 5,131,225 describes a system in produces oxygen using a ceramic-type air separator, chilled and stored on-board for starting an air-breathing engine at high altitude in case of emergency. However such systems are heavy and are actuated in rare emergency situations.

SUMMARY

There is a need for aircraft with high efficiency and with a low emission of pollutants, such as nitrogen oxides (NOx) pollutants.

An approach to increasing aircraft efficiency is to use all on-board power generation engines in an aircraft during non-emergency flight conditions. Current commercial aircraft do not use Auxiliary Power Units (APUs) during non-emergency flight.

Current commercial aircraft have a higher power generation potential than they use during flight. In particular, current commercial aircraft have an auxiliary power unit (APU) that is used in flight only during emergencies and is normally used only while the aircraft is on the ground. During an emergency in flight, the APU may be used to generate power for control and instrument systems in the aircraft. Because the APU is not conventionally used in flight except in an emergency, the power generation capabilities of commercial aircraft are not maximized during flight. The inventors conceived of an approach to provide an inerting system for an APU or other power generation engine in an aircraft. The inerting system provides safety when operating the APU or other power generation engine during flight. Thus, the inerting system allows all power generation engines on an aircraft to be safely used during flight.

Moreover, di-hydrogen is being explored as alternative fuel to power aircraft engines. Thus, an engine capable of using di-hydrogen as a fuel must be reviewed to be safe and efficient in cases of use of di-hydrogen as fuel.

The use of di-hydrogen, and in particular in areas of an aircraft which may not have been continuously used during flight in the prior art, create an opportunity for the inerting of new areas of the aircraft, as well as new systems, operating methods and aircraft configurations that can meet the aviation requirements in terms of safety and fuel efficiency.

The invention may be configured to provide an aircraft inerting system, and a method of operating an aircraft inerting system, which provide solutions to the above described concerns and provides a high level of safety when using APUs and other power generation engines during flight.

The invention may be embodied to provide an aircraft with a high fuel-burn efficiency.

The invention may be embodied to provide an aircraft with low nitrogen oxides emissions.

The invention may be embodied as an aircraft including an air separation device and a combustion engine, wherein the combustion engine comprises a combustion chamber, an injection device comprising a fuel intake and adapted to inject fuel in the combustion chamber, and the air separation device comprises an air intake adapted to intake an original gas mix comprising at least oxygen and nitrogen, an oxygen output at which said air separation device is adapted to output an oxygen-enriched gas mix comprising an oxygen content higher than an oxygen content of the original gas mix upon introduction of an original gas mix at the air intake, and a nitrogen output at which said air separation device is adapted to output a nitrogen-enriched gas mix comprising a nitrogen content higher than a nitrogen content of the original gas mix upon introduction of an original gas mix at the air intake, characterized in that: (i) the nitrogen output of the air separation device is pneumatically connected to an inerting circuit, and (ii) the oxygen output of the air separation device is pneumatically connected to the injection device.

The term "combustion engine" refers to an internal combustion engines in which a fuel or a mix of fuel are oxidized by oxygen, and whereby the chemical energy released is converted into mechanical power.

The air separation device may be adapted to provide a flow of oxygen-enriched gas mix and a flow of nitrogen-enriched gas mix upon receiving, at its intake, an original gas mix comprising at least nitrogen and oxygen such as atmospheric air or cabin air. The air separation device may for example be of the type described in French Patent 3011484 (corresponding to U.S. Pat. No. 9,901,867), which is incorporated by reference.

The original gas mix may be air, with possible variations of composition between a low and a high altitude, between an atmosphere composition and a breathed or recycled cabin air, for example.

A fuel intake may be adapted to receive fuel and deliver the fuel through an output adapted to supply fuel in the combustion chamber. The injection device may be controlled by a computing unit such as a controller.

The nitrogen-enriched gas mix and the oxygen-enriched gas mix may be produced by the air separation device for use in the aircraft, which avoids the equipment and associated weight of having different systems generate the two enriched gas mixtures. The nitrogen-enriched gas mix may be used to inert some areas of the aircraft, such as an APU and associated fuel supply. The oxygen enriched gas mix may be used to improve the combustion of a fuel and gas mixture in a combustion chamber of a combustion engine, such as the APU or other combustion engine.

The injection via an injection device of oxygen-enriched gas mix may be targeted to specific areas of the combustion chamber of a combustion engine. The specific areas of the combustion chamber may be designed to operate at a relatively high ratio of oxygen in the gas and fuel mixture being combusted in the combustion chamber. In a gas turbine engine, typically about 20% to 30% of the total oxygen intake by the engine contributes to combustion. Only about 10% of the oxygen intake is combusted in a first combustion stage, at the head of a primary combustion zone in the combustion chamber. The combustion temperatures in the primary combustion zone are relative high which can cause formation of relatively high levels of nitrogen (NOx) gases. Inject oxygen-enriched gas into the gas fuel mixture entering the first combustion zone(s) of a combustion chamber increases the ratio of oxygen to fuel which improves combustion and reduces nitrogen gas generation. The present invention thus reduces the formation of nitrogen (NOx) gases due to high temperature combustion in the combustion chamber.

Moreover, the air intake of the engine directly from the atmosphere may be slightly reduced thanks to the oxygen-enriched gas mix injection in the combustion chamber, such that a reduction in size of the engine may be considered, thereby providing a lighter aircraft.

The invention therefore proposes a very efficient aircraft which emits a very low level of NOx.

The inerting circuit may be pneumatically connected to an engine compartment of the aircraft. The engine compartment houses the combustion engine.

The combustion engine may be an auxiliary power unit.

The engine compartment may be a compartment situated in the rear fuselage of an aircraft.

An aircraft according to the invention allows to fully make use of the auxiliary power unit and to optimize its efficiency.

The inerting circuit may be pneumatically connected in an upper part of the engine compartment.

Injecting a nitrogen-enriched gas mix in an upper part of the engine compartment may be used to vent the upper part of the engine compartment to purge light gases, such as di-hydrogen. Thus, the injection of the nitrogen-enriched gas mix prevents an accumulation of the light gases, such as di-hydrogen, in the engine compartment housing a combustion engine fueled by di-hydrogen. The inerting of the engine compartment with a nitrogen-enriched gas mix, or inerting at least some areas of the engine compartment, reduces the risk of an unwanted combustion occurring in the engine compartment and improves the safety of the aircraft.

The air separation device may be a device providing nitrogen-enriched gas mix to inert portions of the auxiliary power unit and its fuel supply system and, optionally, to provide an oxygen enriched gas mix to improve combustion efficiency in the combustion chamber of the auxiliary power unit and reduce generation of nitrogen (NOx) gases.

The nitrogen-enriched gas mix may be used to dilute fuel vapors (to reduce the risk of combustion of the vapors) in areas of aircraft in which such vapors may be ignited by other elements such as a heat source for example.

A nitrogen-enriched gas mix circuit may be connected to the nitrogen output of the air separation device. The nitrogen-enriched gas mix circuit may comprise one or more nitrogen mouths to inject nitrogen-enriched gas mix at one or more specific locations. In particular, locations with risks of overheating or fire may be identified during design and equipped with such nitrogen mouth for injecting nitrogen during nominal functioning of the aircraft, of the engine, or at any moment upon command. The targeted injection of nitrogen-enriched gas mix on hot surfaces allows to cool these surfaces down without ignition risk thanks to its very low level of di-oxygen. The di-oxygen level of the nitrogen-enriched gas mix may beneficially be lower than 8%, in particular of about or lower than 4%.

Nitrogen-enriched gas mix flows may also be used to surround components with high ignition risk with an inert volume of nitrogen-enriched gas mix.

The flow of the nitrogen-enriched gas mix may be controlled, or a valve on a portion of the nitrogen-enriched gas mix circuit leading to a combustion chamber, fuel pipe or other device which is intended to receive the nitrogen-enriched gas mix.

The nitrogen enriched gas mix may be injected at targeted zones of the aircraft, and more particularly at targeted zones in the engine compartment where flammable vapors might accumulate. The targeted zones are specific to local zones in the engine compartment, fuel pipe or other regions of the aircraft a risk of a fuel leak or at risk of a fire or an explosion due to fuel leakage or fuel vapors.

The nitrogen-enriched gas mix may also be injected into a combustion chamber or other portion of a combustion engine upon detection of a high fire risk to suppress to suffocate in fire the combustion engine. The nitrogen-enriched gas mix flow may for example be directed fully to an area with fire, or in the whole engine compartment upon fire detection.

The aircraft may further comprise a nitrogen-enriched gas mix tank pneumatically connected to the nitrogen output of the air separation device, so as to constitute and nitrogen-enriched gas mix reserve to be used in case of emergency. A high amount of nitrogen-enriched gas mix may thus be released to prevent a fire or suffocate a fire.

The use of nitrogen-enriched gas mix to limit the inflammability of certain areas and/or to suffocate a fire may allow to reduce the need for fire extinguishing equipment on-board an aircraft, thereby further reducing the aircraft's weight.

The inerting circuit may be pneumatically connected to a peripheral channel around a fuel hose. The peripheral channel may also be termed as an "outer wall" surrounding a pipe. The inerting of a fuel hose may thus be obtained. This characteristic of the invention is particularly relevant for light fuels, such as di-hydrogen. Indeed, di-hydrogen has a very small molecular size. Therefore, fuel hoses containing di-hydrogen may be more subject to leaks, perspiration, or diffusion.

A hose with a peripheral channel filled with an inerting gas such as nitrogen-enriched gas mix, removes any hazard due to such particularities of di-hydrogen.

In a method according to the invention, at least part of the nitrogen-enriched gas mix may be channeled around a fuel pipe.

A flow of nitrogen-enriched gas mix may thus be maintained in the peripheral channel. The nitrogen-enriched gas mix flow may then be ejected outside the aircraft, in the atmosphere, such that any fuel vapor is vented. An inerting circuit comprising at least a portion of the peripheral channel may thus have an output towards outside the aircraft. Any fuel leaking from the fuel hose to its peripheral channel may thus be safely contained and evacuated outside the aircraft.

The intake of the air separation device may be pneumatically connected to a passengers' cabin air.

One or more hydraulic device such as pump(s), valve(s), etc. may be located on a cabin air circuit between the passengers' cabin air and said intake.

Air separation devices are sensible to the ozone, present in the higher atmosphere layers. This is why air separation devices devoted to inerting fuel tanks are usually associated to an ozone converter. As the cabin air has already been deprived of the ozone present in the air, the air separation device of the invention does not need to be associated to an ozone converter. Thereby the complexity and weights of an aircraft according to the invention is maintained at a minimum.

Alternatively or in combination, in some embodiments, the intake of the air separation device may be pneumatically connected to the atmosphere, in particular at low altitudes.

One or more hydraulic device such as pump(s), valve(s), etc. may be located on an air circuit between the original air source such as a cabin, and said intake of the air separation device. The original air may also be conditioned in temperature, so as to optimize the functioning and operating lifetime of the air separation device.

The aircraft may comprise an engine controller adapted to control at least one flow selected from: a flow of original gas mix, a flow of oxygen-enriched gas mix, a flow of nitrogen-enriched gas mix, and a flow of fuel for said combustion engine.

The controller may be of any type within the processing devices.

The controller may control one or more of the flows of original gas mix, nitrogen-enriched gas mix or oxygen-enriched gas mix, such that it may tune the injection of each gas stream to the engine functioning. As described in relation to the use of nitrogen-enriched gas mix in case of emergency or identified risk, the controller may control the flow of nitrogen-enriched gas mix so as to adapt the use of nitrogen-enriched gas mix to the situation.

In the same way, the controller may adapt the amount of oxygen-enriched gas mix injected in the combustion engine.

A hydraulic circuit between the oxygen output of the air separation device and the injection device comprises a pump.

The pump is adapted to increase a pressure of the oxygen-enriched gas mix.

The pump is more specifically placed on a hydraulic circuit between the oxygen output of the air separation device and a mixing chamber or premixer, such that the oxygen-enriched gas mix is injected with a higher pressure in the premixer.

The fuel may be di-hydrogen.

The fuel intake of the injection device may be adapted to receive di-hydrogen.

Di-hydrogen oxidization mainly releases water and NOx. By removing nitrogen from the first combustion stages—that is, by injecting the oxygen-enriched gas mix from the air separation device in the combustion chamber with the di-hydrogen—the inventors realized that the NOx production of a di-hydrogen fueled engine is reduced to nearly zero.

The injection device may be adapted to inject a mix of oxygen-enriched gas mix and fuel in an area of the combustion chamber at which the fuel combustion primarily happen.

The oxygen-enriched gas mix is only combusted in the primary zone of the combustion engine, which is the area of the combustion chamber with the highest temperature, where most of the combustion between fuel and oxygen happens. This area of the combustion chamber is where it is most needed to avoid the presence of nitrogen so as to reduce the production of NOx. The inventors realized that it is not necessary to inject only oxygen in the combustion chamber to reduce drastically the amount of NOx produced, but on the contrary, that injecting oxygen-enriched gas mix in a targeted area of the combustion chamber while the rest of the engine remains fed by air allows such result.

The air separation device thereby need not be of an important volume and mass, as it does not need to produce a high amount of oxygen-enriched gas mix to feed the whole engine, but only a small fraction of the engine's total oxygen intake.

The aircraft may further include a premixer: comprising an oxygen intake adapted to receive an oxygen-enriched gas mix flow, a fuel intake adapted to receive a fuel flow, and an output adapted to output a mix of fuel and oxygen-enriched gas mix, wherein the premixer is adapted to mix fuel and oxygen-enriched gas mix upon introduction of fuel at its fuel intake and of oxygen-enriched gas mix at its oxygen intake.

The premixer may include a mixing chamber in which the mix of fuel and oxygen-enriched gas mix happen upon introduction of fuel at its fuel intake and of oxygen-enriched gas mix at its oxygen intake.

The fuel intake is pneumatically connected to a fuel source such as a fuel tank through a fuel circuit and a pump.

The output of the premixer is pneumatically connected to the injection device.

The nitrogen output of the air separation device may be pneumatically connected to the combustion chamber through a controlled safety valve. The combustion engine may be shut off by introduction of a nitrogen-enriched gas mix flow instead of a fuel flow in the engine's combustion chamber.

The controlled safety valve is closed in normal use. However, in case of emergency, the nitrogen-enriched gas mix may be injected directly into the engine so as to suffocate any combustion and stop it rapidly.

Similarly the oxygen output of the air separation device is pneumatically connected to the combustion chamber through a controlled valve, said control valve being open during nominal operation but may be closed in case of emergency, such that the oxygen-enriched gas mix supply to the engine may be cut in case of emergency.

The aircraft may comprise other valves to control nitrogen-enriched gas mix and/or oxygen-enriched gas mix flows. For example, fuel pipes may also be inerted and vented by a flow of nitrogen-enriched gas mix, so as to ensure that no fuel remains in fuel pipes. This may particularly be beneficial in fuel pipes leading to the combustion chamber of the combustion engine. More particularly, with light fuels such as di-hydrogen, venting fuel pipes may be essential as di-hydrogen may otherwise perspire through the pipe during a long period of parking of the aircraft, thereby inducing risks.

The nitrogen-enriched gas mix flow may thus be injected relatively upward in the main fuel pipe leading to the engine prior to the engine stop, so as to ensure that any fuel in the pipe is replaced by nitrogen-enriched gas mix, and that there is no remaining fuel in the pipes when the engine shuts down by suffocation. This provides for a safe shutdown phase of the engine, as well as safe operations in the engine compartment afterwards.

The invention may be embodied as a method for operating an aircraft's engine whereby: an oxygen-enriched gas mix flow and a nitrogen-enriched gas mix flow are produced from an air flow by an air separation device, and the oxygen-enriched gas mix is injected with fuel in a combustion chamber through an injection device, The nitrogen-enriched gas mix is injected in an inerting circuit.

A method according to the invention allows to operate an aircraft, and in particular an auxiliary power unit of an aircraft, with a high efficiency, a low level of or no NOx emissions, and a very high safety.

The invention also extends to other possible combinations of features described in the above description and in the following description relative to the figures. In particular, the invention extends to methods comprising features described in relation to the aircraft; the invention extends to aircrafts comprising features described in relation to the method.

SUMMARY OF DRAWINGS

Some specific exemplary embodiments and aspects of the invention are described in the following description in reference to the accompanying figures.

DETAILED DESCRIPTION

Figure 1:
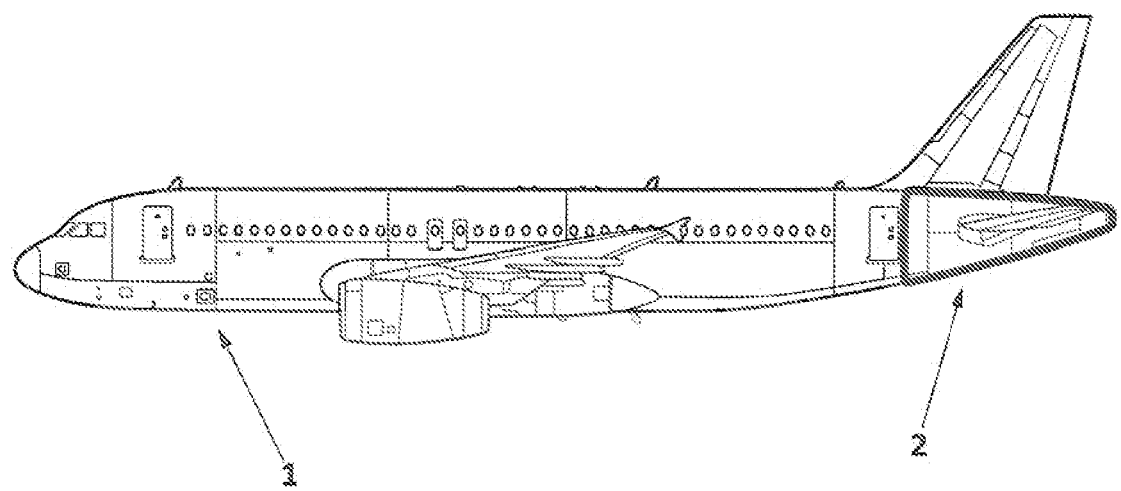
FIG. 1 is a schematic representation of an aircraft according to the invention comprising a rear fuselage section with an engine compartment hosting a combustion engine and an air separation device.

FIG. 1 shows an aircraft 1 is represented. The aircraft comprises a rear fuselage section 2 in which is a combustion engine 38, such as an auxiliary power unit (APU). The auxiliary power unit and an air separation device are installed in an engine compartment in the rear fuselage section.

Figure 2:
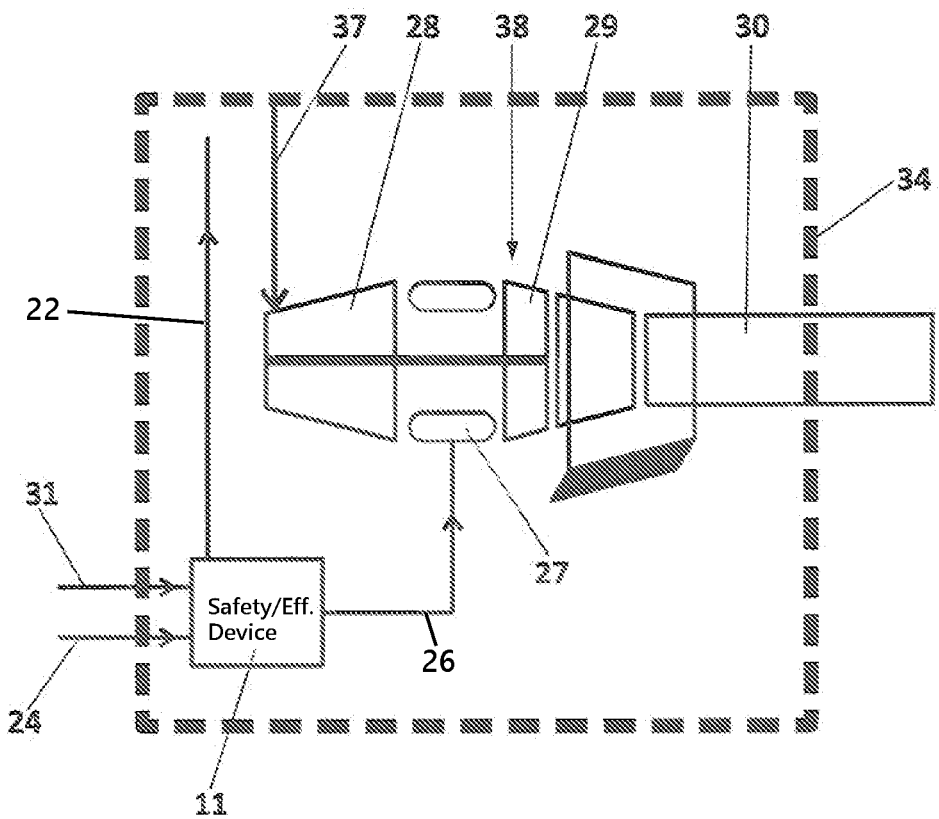
FIG. 2 is a schematic representation of an engine compartment of an aircraft according to the invention.

FIG. 2 shows an engine compartment 34 in the rear fuselage section 2, shown in FIG. 1. The auxiliary power unit engine (APU) 38 is housed in this engine compartment 34. The APU includes a compressor 28 that takes in and compresses atmospheric air 37, mixes the compressed air with fuel a combustion chamber 27 which generates hot gases that drive a turbine 29 that generates the power produced by the APU. Exhaust gases 30 from the APU are discharged into the atmosphere.

The engine compartment 34 houses a safety and efficiency device 11, which is or includes at least one air separation device. The safety and efficiency device 11 receives fuel via a fuel conduit 24 from a fuel source such as a fuel tank in the aircraft. The safety and efficient device also receives an original gas mix flow via a conduit 31, wherein the original gas mix flow may be cabin air 31 conditioned for a passenger cabin in the aircraft. The one or more air separation device that are or a part of the safety and efficiency device 11 separate(s) the original gas mix flow into an oxygen-enriched gas mix flow and a nitrogen-enriched gas mix flow. The safety and efficiency device 11 mixes the fuel received via that fuel conduit 24 with the oxygen-enriched gas mix to obtain a gas-fuel mixture to be supplied to an injection device 12 (FIG. 3) that injects the mixture into the combustion chamber 27 of the APU.

Figure 3:
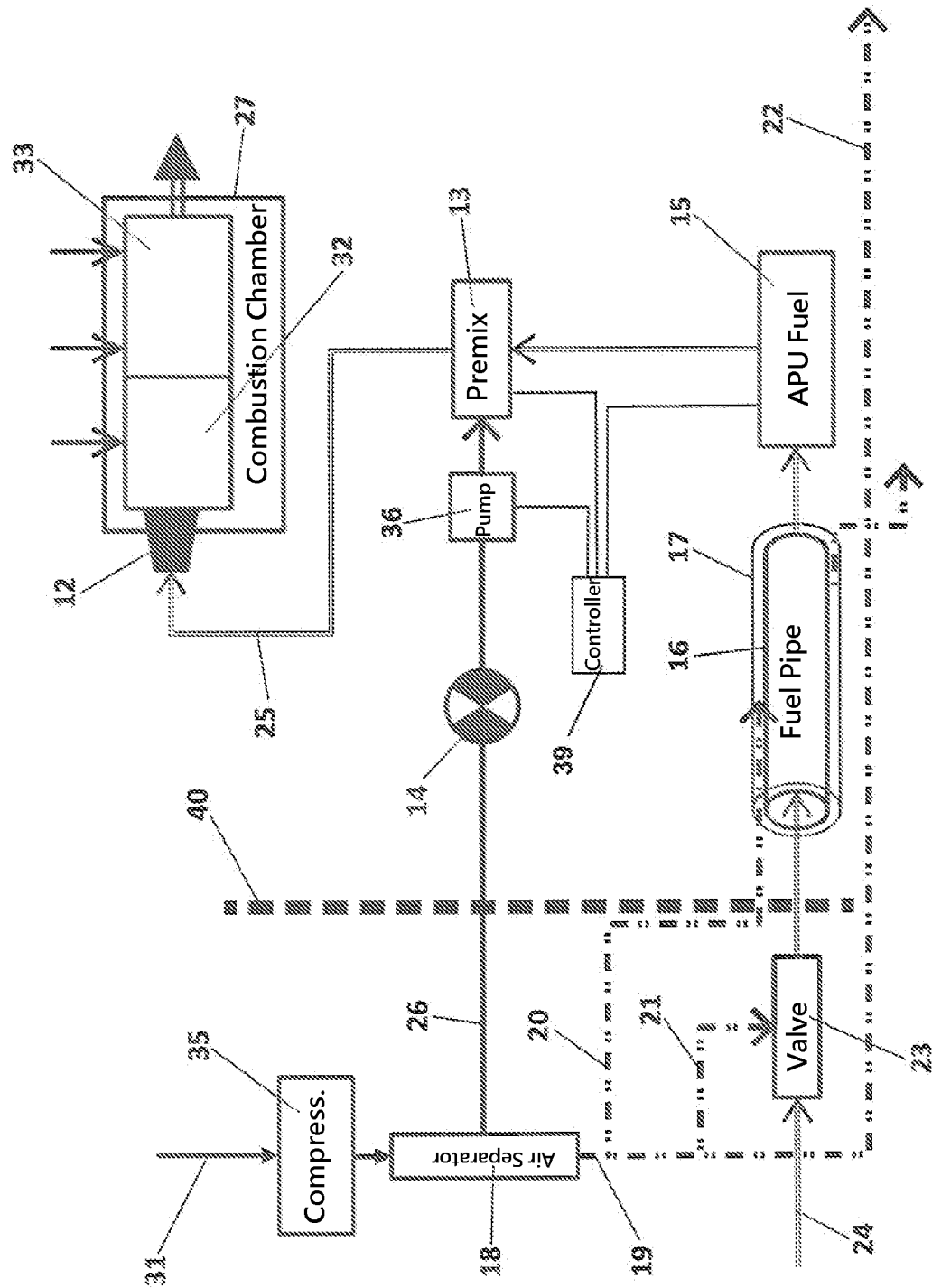
FIG. 3 is a schematic representation of systems of an aircraft according to the invention.

In other embodiments of the invention, parts of the safety and efficiency device 11 may be outside of the engine compartment, as shown in FIG. 3 wherein the safety and efficiency device 11 is outside a wall 40 of the engine compartment for an APU.

FIG. 3 schematically represents an example of the safety and efficiency device 11. In this embodiment, the safety and efficiency device 11 comprises an air separation device 18. The air separation device 18 receives cabin air via an intake. The cabin air is compressed by a compressor 35 that supplies compressed cabin air to the air separation device 18 at a controlled pressure.

The air separation device 18 is adapted to separate the compressed cabin air flow received at its intake into an oxygen-enriched gas mix flow 26 that flows is exhausted from the air separation device via an oxygen output, and a nitrogen-enriched gas mix flow 19 that is also exhausted from the air-separation device. The air separation device 18 may for example be of the type comprising hollow fiber membranes through which flows the compressed cabin air. Oxygen in the compressed cabin air flows through porous walls of the membranes while the nitrogen cannot permeate through the walls. The porosity of the walls is selected to allow oxygen to pass but block nitrogen. The gas flow remaining within the hollow fiber membranes becomes nitrogen enriched.

The oxygen-enriched gas mix flow 26 flows through pipes, e.g., conduits, and moved by a pump 36 adapted to pressurize the oxygen-enriched gas mix flow to a controlled pressure and feed the oxygen-enriched gas mix flow into a premixer 13.

The premixer 13 also receives fuel from a fuel flow line 24. The premixer 13 comprises a mixing chamber adapted to mix the oxygen-enriched gas mix and the fuel. An output of the premixer 13 is connected to an input of an injection device 12, such that the fuel and oxygen-enriched gas mix may be conducted to the injection device 12. The injection device 12 is adapted and installed so as to be adapted to inject the fuel and oxygen-enriched gas mix directly into a primary zone 32 of the combustion chamber 27. The primary zone 32 of the combustion chamber is where the combustion between fuel and oxygen ignites, and this is where the highest temperatures are reached. Indeed, more air drawn from the atmosphere and compressed by the compressor 28 of the turbine engine is injected into the primary zone 32 and secondary zone 33. The combustion mix of fuel and oxygen moves towards the turbine from the primary zone to the secondary zone and out to the turbine. The temperature in the secondary zone 33 of the combustion chamber 27 is thus lower than in the primary zone 32. The injection of fuel and oxygen enriched air by the injection device 12 at the head of the primary zone provides a very pure mix with low levels of nitrogen, thereby reducing drastically the NOx byproducts during combustion.

Before being brought to the premixer 13, the fuel is extracted from tanks, and is brought by fuel pipes 16 to the premixer 13. The fuel pipes 16 may comprise double-wall forming a peripheral channel 17 around the fuel pipe 16. On FIG. 3, only part of the double-walled fuel pipe 16 is represented. However, such fuel pipe may be used on any pipe section to transport fuel or a mix comprising fuel.

In the embodiment presented in FIG. 3, the nitrogen-enriched gas mix flow 19 is separated into multiple nitrogen-enriched gas mix flows (illustrated by lines of dashes separated by two dots in FIG. 3). A first nitrogen-enriched gas mix flow 20 is directed towards the peripheral channel 17 around fuel pipes 16. Thereby any fuel vapor that would result from a permeation or a leak through a wall of the pipe 16 is not only vented by the nitrogen-enriched gas mix flow but also inerted by the high nitrogen content of the nitrogen-enriched gas mix. The nitrogen-enriched gas mix flow may then be vented to the atmosphere outside the aircraft through venting ports for example.

A second nitrogen-enriched gas mix flow 21 is directed towards a controlled safety vale or fuel flow shut-off valve 23. This fuel flow shut-off valve 23 allows to cut a fuel flow supply from a fuel tank towards the premixer 13. Additionally, this fuel flow shut-off valve 23 allows to inject a nitrogen-enriched gas mix flow 21 into the fuel pipes 16 instead of fuel, such as a nitrogen-enriched gas mix flow flows towards the premixer 13 until the combustion chamber 27. When the nitrogen-enriched gas mix reaches the combustion chamber, the combustion is suffocated such that a safe shut down of the turbine engine is obtained.

Moreover, when the engine stops by suffocation, the pipes 16 between the fuel flow shut-off valve 23 and the combustion chamber are also clean of fuel and inerted by the nitrogen-enriched gas mix flow 21.

When the fuel flow shut-off valve 23 is closed to fuel and open to nitrogen-enriched gas mix, another shut-off valve 14 may close the oxygen-enriched gas mix flow to the premixer 13, such that the premixer feeds the injection system and in its turn the combustion chamber only with nitrogen-enriched gas mix.

A third nitrogen-enriched gas mix flow 22 is directed to specific predetermined zones (not detailed in FIG. 3) in the engine compartment such as hot parts that require cooling in order to mitigate ignition risks, areas where leaks of fuel or other combustible product such as for example greases may happen and must be inerted. The third nitrogen-enriched gas mix flow 22 may also be directed towards an upper portion of the engine compartment in order to vent it. This is particularly beneficial in case of lighter than air fuel or combustibles such as di-hydrogen. The upper portion of the engine compartment 34 may thus be inerted and vented by a nitrogen-enriched gas mix flow 22.

The aircraft example presented on FIGS. 1-3 also comprises an auxiliary power unit fuel system 15. The fuel system 15 is not detailed on FIG. 3. The auxiliary power unit fuel system 15 is designed to supply fuel to the auxiliary power unit at any ambient temperature, pressure or altitude within the operating envelope of the aircraft. The auxiliary power unit fuel system 15 comprises: a fuel flow filter, a fuel pump, a pressure regulation device, a fuel shut off valve, a fuel control unit and some sensors such as for example temperature sensor, and pressure sensor. The auxiliary power unit fuel system is adapted to operate properly with fuel containing ice at low temperatures, fuel containing additives and contaminants.

FIG. 3 shows a controller 39 adapted to control a flow of oxygen-enriched gas mix 26 by controlling the oxygen-enriched gas mix pump 36. The controller 39 is also adapted to control a flow of fuel 24 for said combustion engine 38 by controlling the fuel system 15. The controller 39 may also control the premixer 13, so as to control the mix percentages between fuel and oxygen-enriched gas mix.

In other embodiments of the invention, the controller 39 may also adapted to control the compressor 35 so as to control an air supply to the air separation device 18. The controller may also be adapted to control the fuel shut-off valve 23, and/or the oxygen-enriched gas mix shut-off valve 14.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft comprising:
   a combustion engine including a combustion chamber, and an injection device including a fuel intake adapted to inject fuel in the combustion chamber and receive fuel through the fuel intake,
   an inerting circuit, and
   an air separation device including:
   an air intake adapted to intake an original gas mix comprising at least oxygen and nitrogen,
   an oxygen output from said air separation device is adapted to output an oxygen-enriched gas mix having an oxygen content higher than an oxygen content of the original gas mix, and
   a nitrogen output from which said air separation device is adapted to output a nitrogen-enriched gas mix having a nitrogen content higher than a nitrogen content of the original gas mix,
   wherein the nitrogen output of the air separation device is in fluid communication with the inerting circuit to provide the nitrogen-enriched gas mix to the inerting circuit,
   wherein the oxygen output of the air separation device is in fluid communication with the injection device to provide the oxygen-enriched gas mix to the injection device, and
   wherein the inerting circuit is in fluid communication with a peripheral channel around a fuel hose adapted to supply fuel to the fuel intake.

2. The aircraft according to claim 1, wherein the inerting circuit is in fluid communication with an engine compartment of the aircraft.

3. The aircraft according to claim 2, wherein the inerting circuit is in fluid communication with an upper part of the engine compartment.

4. The aircraft according to claim 1, further comprising a fuselage with a cabin adapted for passengers, and wherein the air intake of the air separation device is in fluid communication with a source of cabin air flowing to or from the cabin.

5. The aircraft according to claim 1, further comprising an engine controller configured to control at least one flow of: the original gas mix, the oxygen-enriched gas mix, the nitrogen-enriched gas mix, and the fuel.

6. The aircraft according to claim 1, further comprising a pneumatic circuit connecting the oxygen output of the air separation device and the injection device, wherein the pneumatic circuit includes a pump configured to pump the oxygen-enriched gas mix to the injection device.

7. The aircraft according to claim 1, wherein the fuel intake of the injection device is adapted to receive di-hydrogen fuel.

8. The aircraft according to claim 1, wherein the injection device is adapted to inject a mix of the oxygen-enriched gas mix and the fuel into the combustion chamber.

9. The aircraft according to claim 1, further comprising a premixer including:
- an oxygen intake adapted to receive the oxygen-enriched gas mix from the air separation device;
- a second fuel intake adapted to receive the fuel, wherein the premixer is adapted to mix the fuel and the oxygen-enriched gas mix, and
- an output adapted to output a mix of the fuel and the oxygen-enriched gas mix.

10. The aircraft according to claim 1, further comprising a controlled safety valve in a conduit pneumatically connecting the nitrogen output of the air separation device to the combustion chamber.

11. A method comprising
- producing an oxygen-enriched gas mix flow and a nitrogen-enriched gas mix from an air flow in an air separation device in an aircraft,
- injecting the oxygen-enriched gas mix and a fuel in a combustion chamber of a combustion engine generating power for the aircraft; and
- injecting the nitrogen-enriched gas mix in an inerting circuit channeling the
- nitrogen-enriched gas mix around a fuel pipe providing the fuel to the combustion chamber;
- wherein the channeling of the nitrogen-enriched gas mix includes flowing the nitrogen-enriched gas mix through a peripheral channel between a sleeve surrounding the fuel pipe and the fuel pipe.

12. The method according to claim 11, wherein the fuel is di-hydrogen.

13. The method according to claim 11, further comprising shutting off the combustion engine by injecting the nitrogen-enriched gas mix into the combustion chamber.

14. The method according to claim 13, wherein the step of shutting off the combustion engine includes injecting the nitrogen-enriched gas mix into the fuel pipe and shutting off the injection of the oxygen-enriched gas mix into the combustion chamber.

15. The method of claim 11, wherein the air flow is a flow of cabin air generated to flow into or exhausted from a passenger cabin in a fuselage of the aircraft.

16. The method of claim 11, wherein the combustion engine is an auxiliary power unit.

17. The method of claim 16, wherein the method is performed while the aircraft is in flight.

* * * * *